United States Patent [19]

Aso et al.

[11] Patent Number: 4,833,291
[45] Date of Patent: May 23, 1989

[54] THREE-POINT SUPPORT GUIDE OF A WIRE ELECTRIC DISCHARGE MACHINE

[75] Inventors: Toshiyuki Aso, Hino; Yuki Kita, Hachioji, both of Japan

[73] Assignee: Fanuc Ltd., Minamitsuru, Japan

[21] Appl. No.: 146,829

[22] PCT Filed: May 21, 1987

[86] PCT No.: PCT/JP87/00326

§ 371 Date: Jan. 14, 1988

§ 102(e) Date: Jan. 14, 1988

[87] PCT Pub. No.: WO87/07194

PCT Pub. Date: Dec. 3, 1987

[30] Foreign Application Priority Data

May 28, 1986 [JP] Japan .................... 61-121198

[51] Int. Cl.⁴ .................................... B23H 7/10
[52] U.S. Cl. ..................................... 219/69.12
[58] Field of Search ............. 219/69 W, 69 E, 696; 72/467; 204/206, 224 M

[56] References Cited

U.S. PATENT DOCUMENTS

| | | | |
|---|---|---|---|
| 3,943,322 | 3/1976 | Lehmann et al. | 219/69 W |
| 4,129,052 | 12/1978 | Biebrich | 72/467 |
| 4,303,442 | 12/1981 | Hara et al. | 72/467 |
| 4,392,397 | 7/1983 | Engelfriet | 72/467 |
| 4,605,834 | 8/1986 | Inoue | 219/69 W |
| 4,613,740 | 9/1986 | Ichikawa | 219/69 W |
| 4,638,140 | 1/1987 | Obara et al. | 219/69 W |
| 4,686,344 | 8/1987 | Nakayama | 219/69 W |

FOREIGN PATENT DOCUMENTS

| | | | |
|---|---|---|---|
| 0001184 | 3/1979 | European Pat. Off. | 72/467 |
| 55-25012 | 7/1980 | Japan . | |
| 169722 | 9/1984 | Japan | 219/69 W |
| 232728 | 12/1984 | Japan | 219/69 W |
| 167718 | 8/1985 | Japan | 219/69 W |
| 134518U | 9/1985 | Japan . | |
| 173818 | 8/1986 | Japan | 219/69 W |

Primary Examiner—A. D. Pellinen
Assistant Examiner—Geoffrey S. Evans
Attorney, Agent, or Firm—Staas & Halsey

[57] ABSTRACT

A three-point support guide (1) for a wire electrode 100 in a wire electric discharge machine, which includes first and second guide members (20, 60) each formed of a small, thin diamond. The first guide member (20), is supported in the body (10) of the guide (1) so as to face a wire electrode bore (12). A movable member (40) is provided which is movable toward and away from the first guide member (20). The second guide member (60) is embedded in the movable member (40) so as to face the first guide member (20). The second guide member (60), in conjunction with the first guide member (20), provides three-point support of the wire electrode (100).

8 Claims, 3 Drawing Sheets

THREE-POINT SUPPORT GUIDE OF A WIRE ELECTRIC DISCHARGE MACHINE

TECHNICAL FIELD

The present invention relates to a guide for supporting a wire electrode in a wire electric discharge machine, and more particularly, to a threepoint support guide which is low-priced and capable of withstanding prolonged use.

BACKGROUND ART

In a wire electric discharge machine, a wire electrode, which is fed relatively to a workpiece, is generally supported on a wire electrode in a predetermined electrode feed path by means of upper and lower guides that are located above and below the workpiece, respectively. In order to support the wire electrode stably, as is generally known, the wire electrode is three-point-supported by means of a guide groove of a fixed guide portion and a movable guide member, which is opposed to the fixed guide portion so as to enable to get close to and away from the same. Since both these guide portions, subject to sliding friction with the wire electrode, are susceptible to wear, they are conventionally formed of a wear-resistant material, such as sapphire.

The conventional guide of this type does not, however, have satisfactory wear resistance yet, and cannot therefore resist prolonged use, thus requiring troublesome replacement work with relatively high frequency. Conventionally, moreover, the guide portions are fixed to a main body of the guide by staking, for example. On account of restrictions on the fixing technique, the guide portions, made of sapphire or some other expensive material, must inevitably be relatively large-sized. In consequence, it is hard to lower the costs of the guide.

DISCLOSURE OF THE INVENTION

The present invention eliminates the aforementioned drawbacks of the prior art three-point support guide, and has an object to improve the wear resistance of guide portions which are subject to sliding friction with a wire electrode, thereby lengthening the working life of a guide, and to reduce the size of the guide portions, thereby permitting reduction in the manufacturing cost of the guide.

In order to achieve the above object, a three-point support guide for a wire electrode in a wire electric discharge machine, according to the present invention, comprises a first guide member formed of a small, thin diamond embedded in a main body of the three-point support guide so as to face a wire electrode bore formed in the body of three-point support guide, the first guide member being formed with a guide groove for guiding a wire elecrode; and a second guide member formed of a small, thin diamond embedded in a movable member so as to face the first guide member, the movable member being movable toward and away from the first guide member.

According to the present invention, as described above, the wire electrode is three-point-supported by means of the guide groove of the first guide member and the second guide member which is embedded in the movable member which is movable toward and away from the first guide member. Thus, the wire electrode can be supported stably. Since both the guide members are formed of hard diamond which can well resist sliding friction with the wire electrode, they can be used for a long period of time. Therefore, the replacement work, which requires much labor, can be considerably reduced in frequency, so that the productivity of the wire electric discharge machine can be improved. Also, a small, thin diamond is used for each guide member. Accordingly, it is unnecesary to use many diamonds, which are expensive, so that the guide can be lowered in cost.

BEST MODE OF CARRYING OUT THE INVENTION

Figure 1:
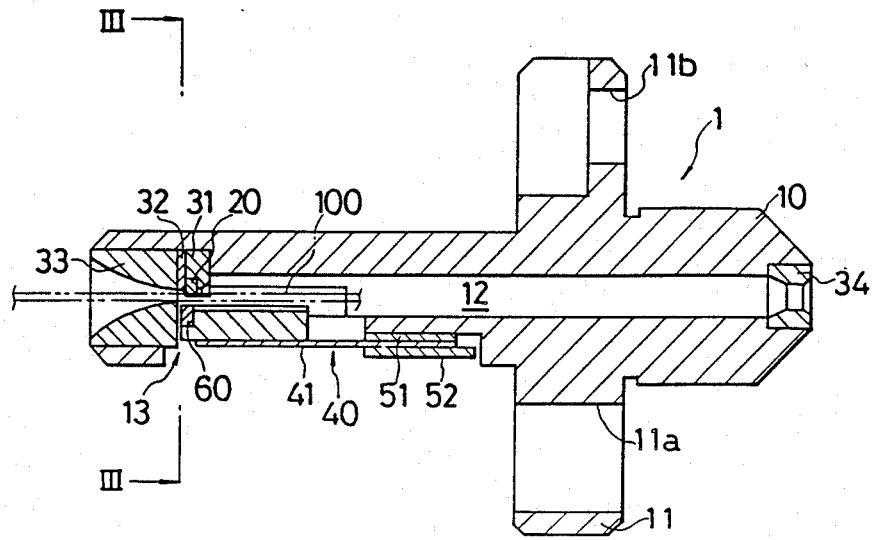
FIG. 1 is a schematic longitudinal sectional view showing a three-point support guide according to an embodiment of the present invention.
Figure 2:
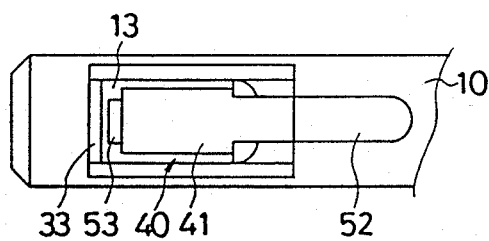
FIG. 2 is a schematic partial bottom view showing a movable member of the guide and an arrangement surrounding the same.

FIGS. 1 t 5 show a three-point support guide for a wire electrode in a wire electric discharge machine to an embodiment of the present invention. The guide 1 is adapted to be mounted on a guide mechanism 2 (FIG. 6) which will be mentioned later.

The guide 1 comprises a main body 10, which is in the form of a cylindrical structure having a flange portion 11 at one end portion thereof. A working-fluid inlet hole 11a and a suitable number of bolt holes (one of which is denoted by 11b) are bored through the flange portion 11. The main body 10 is formed with a wire electrode bore 12 which, widened radially at both ends, extends along the axis of the main body 10. A notch 13, rectangular in shape as viewed from the bottom, is formed at the middle portion of the main body 10, communicating with the bore 12.

Figure 3:
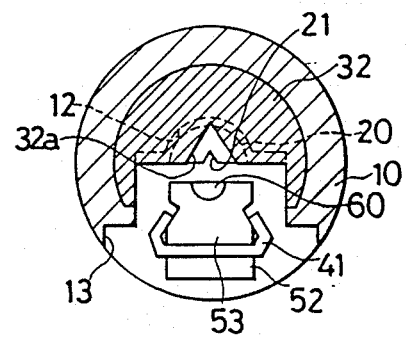
FIG. 3 is a schematic enlarged sectional view of first and second guide members of the guide and an arrangement surrounding the same, as taken along line III—III of FIG. 1.
Figure 4:
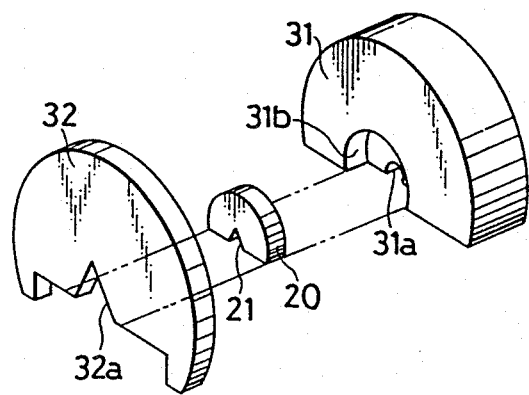
FIG. 4 is a partial exploded perspective view showing the first guide member and a support member therefor.
Figure 5:
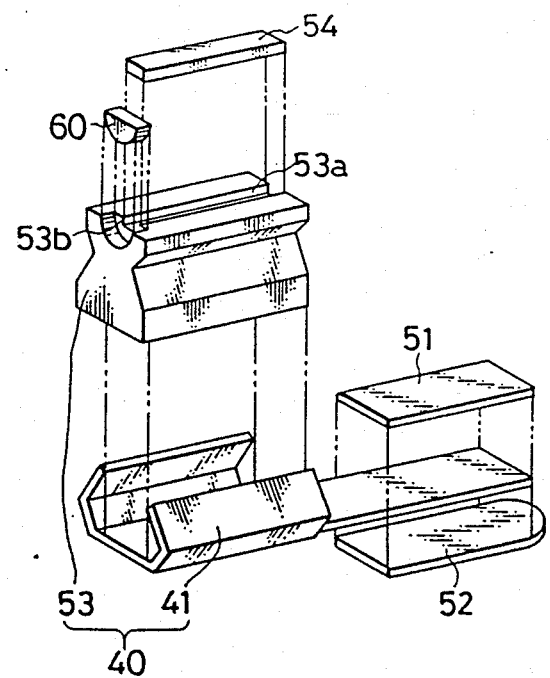
FIG. 5 is a partial exploded perspective view showing the second guide member and the movable member.

A first guide member 20, in the form of a semicircular disk, is embedded in the main body 10 of the guide 1 so as to face the wire electrode bore 12. Inside the one-side widened portion of the bore 12, the first guide member 20 is fitted in a hollow 31b of a semicircular support member 31 so as to be sandwiched between the support member 31 and a semicircular support member 32 (the members 31 and 32 constitute a first support member). In this state, the guide member 20 is held between a step surface of the main body 10 and a ruby guide 33 which is fixed in the bore 12 by staking. As shown in FIGS. 3 and 4, the first guide member 20 is formed of a small, thin semicircular diamond which preferably has a diameter and a thickness not higher than several times that of the diameter of a wire electrode 100. A guide groove 21, which is V-shaped, for example, and serves to guide and support the wire electrode 100, is formed in that end face of the guide member 20 on the side of the bore 12. In consideration of the wire supporting capability and wear resistance, the thickness of the guide member 20 is adjusted to about half or more of the diameter of the wire electrode. The size of the groove 21 is set depending on the diameter of the wire electrode. The support members 31 and 32 are made, for example, of stainless-steel alloy, and are formed with a semicircular groove 31a and a V-shaped groove 32a, respectively, on those end faces thereof on the side of the bore 12. The grooves 31a and 32a serve to prevent the support members 31 and 32 from touching the wire electrode 100. Preferably, the guide member 20 is plated, and is fixed to the support members 31 and 32 by silver soldering. In FIG. 1, numeral 34 denotes a ruby guide which is fixed by staking after being fitted into the other-side widened portion of the bore 12.

A movable member 40 is mounted on the middle portion of the outer peripheral wall of the main body 10, on the side of the notch 13. The movable member 40 is disposed in the notch 13 of the main body 10 so that it can get close to and away from the first guide member 20. More specifically, the movable member 40 includes a plate like spring member 41 extending parallel with the lengthwise axis of the body 10. The spring member 41 has a substantially U-shaped cross section at one end portion thereof. The proximal end portion of the spring member 41 is fixed to the outer peripheral wall of the main body 10 by staking, in a manner such that it is held solidly between a pair of support plates 51 and 52. The free end portion of the spring member 41 can shift its position in the radial direction of the guide 1. Further, the movable member 40 includes a support member 53, for use as a second support member, provided at the free-end side of the spring member 41. The member 53, which is formed of e.g. stainless-steel alloy, is tapered on either side, and is clamped by the spring member 41. A groove 53a is formed on that surface of the support member 53 on the opposite side thereof to the spring member 41, extending along a feed path for the wire electrode 100. A plastic member 54, for use as an electrical insulating layer, is disposed in the groove 53a, whereby the wire electrode 100 is insulated electrically from the movable member 40, and hence, from the guide 1.

Facing the first guide member 20, moreover, a second guide member 60 is embedded in the movable member 40. The member 60 is formed of a small, thin semicircular diamond which preferably has a diameter and a thickness not higher than several times that of the wire electrode diameter. More specifically, the second guide member 60 is plated in advance, and is located at a stepped portion 53b which is formed on the free-end side of the support member 53, facing the first guide member 20. The member 60 is fixed to the support member 53 by silver soldering.

Figure 6:
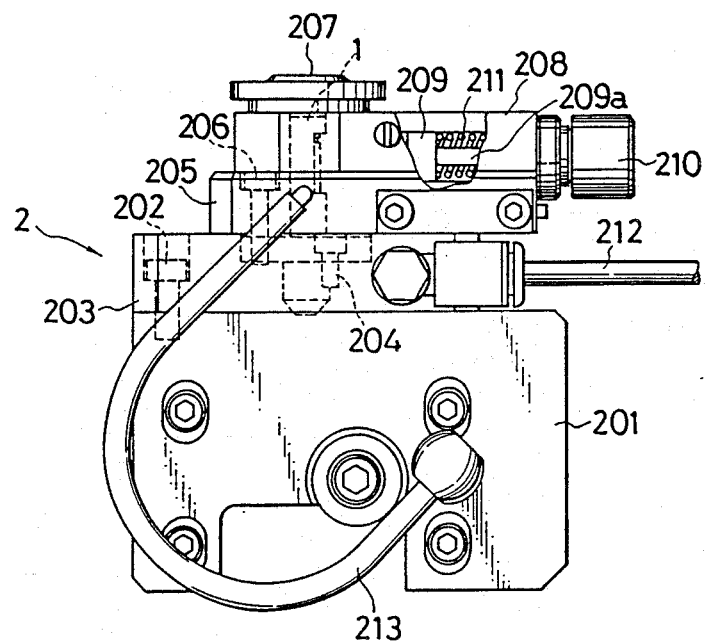
FIG. 6 is a schematic cutaway side view showing a guide mechanism furnished with the three-point support guide.

FIG. 6 shows the guide mechanism which incorporates the three-point support guide 1 constructed in this manner. The guide 1 is fixed, by means of a bolt 204, to a pedestal 203 which is fixedly mounted on a guide base 201 of the guide mechanism 2 by means of a bolt 202. A die base 205, which is adapted to contain the guide 1, is fixed to the pedestal 203 by means of a bolt 206. A nozzle 207 is screwed to the base 205. Also, the base 205 is formed integrally with a cylinder 208. The spring member 41 of the guide 1 can be pressed by means of one end of a piston rod 209a integral with a piston 209, which is slidably disposed in the cylinder 208. A retaining member 210, used to hold the other end of the piston rod 209a, is screwed to the cylinder 208. A spring 211 is interposed between the piston 209 and the retaining member 210. The pressure or load on the spring member 41, can be adjusted by rotating the retaining member 210 to shift the axial position thereof. Numeral 212 denotes a compressed-air supply pipe. If compressed air is fed through the pipe 212, the piston 209 shifts its position to the right of FIG. 6 against the urging force of the spring 211. Numeral 213 denotes a working-fluid supply pipe. A working fluid fed through the pipe 213 is injected from a nozzle hole (not shown) of nozzle 207 via working-fluid inlet hole 11a in the flange portion 11 of the guide 1 and the like. In this manner, the working fluid is supplied to an electric discharge-working region of a workpiece (not shown) which is located above the guide mechanism 2.

The operation of the aforementioned three-point support guide 1 will now be described.

First, in extending the wire electrode 100, compressed air is fed through the compressed-air supply pipe 212 into a cylinder chamber (not shown) of the cylinder 208 on the side of the guide 1, thereby moving the piston 209 to the right of FIG. 6. Thus, the movable member 40, and hence, the second guide member 60 embedded therein, are moved away from the first guide member 20, resisting the urging force of the spring 211 or the pressure applied to the spring member 41 by the piston rod 209a. Then, the wire electrode 100 is inserted, for extension, into a wire electrode bore (not shown), which is formed in the guide base 201 of the guide mechanism 2, and the wire electrode bore 12 of the three-point support guide 1. After the end of the extension, the supply of the compressed air to the cylinder 208 through the pipe 212 is stopped. At this point of time, the wire electrode 100 is located in the guide groove 21 of the first guide member 20. Therefore, if the compressed air is cut off, thereby allowing the piston 209 to be moved to the left of FIG. 6 by the urging force of the spring 211, so that the spring member 41 is pressed by the piston rod 209a integral with the piston 209, then the wire electrode 100 is three-point-supported, with stability, by the guide groove 21 of the first guide member 20 and the opposite end face of the second guide member 60. When the working fluid is supplied from the working-fluid supply pipe 213, it is injected from the nozzle hole of the nozzle 207 of the guide mechanism 2 toward the electric discharge-working region, via the working-fluid inlet hole 11a of the guide 1 and the like. During the electric discharge working, the guide members 20 and 60, which are both formed of hard diamond, can well resist the sliding friction with the wire electrode 100. Thus, the guide 1 can be used for a long period of time, and therefore, need not be replaced frequently.

We claim:

1. A three-point support guide for a wire electrode in a wire electric discharge machine, comprising:

a body having a wire electrode bore formed therein;

a first guide member formed of a small, thin diamond supported in said body so as to face said bore, said first guide member being formed with a guide groove for guiding a wire electrode; and a second guide member formed of a small, thin diamond mounted on a movable member so as to face said first guide member, said movable member being movable toward and away from said first guide member, the diameters and thicknesses of said first and second support members being set to values not higher than that of the diameter of said wire electrode.

2. A three-point support guide for a wire electrode in a wire electric discharge machine according to claim 1, wherein said first guide member is supported by a first support member disposed inside one end portion of said wire electrode bore.

3. A three-point support guide for a wire electrode in a wire electric discharge machine according to claim 1, wherein said movable member includes a spring member fixed, at one end portion thereof, to said body and a second support member fixed to the free end portion of said spring member, said second guide member being supported by said second support member.

4. A three-point support guide for a wire electrode in a wire electric discharge machine comprising:
- a body having a wire electrode bore formed therein;
- a first guide member formed of a small, thin diamond supported in said body so as to face said bore, said first guide member being formed with a guide groove for guiding a wire electrode; and
- a second guide member formed of a small, thin diamond mounted on a movable member so as to face said first guide member, said movable member being movable toward and away from said first guide member, said movable member including a spring member fixed, at one end portion thereof, to said body and a second support member fixed to the free end portion of said spring member, said second guide member being supported by said second support member, and said second support member further being formed with an electrical insulating layer extending along a feed path for said wire electrode.

5. A three-point support guide for a wire electrode in a wire electric discharge machine according to claim 4, wherein the diameters and thicknesses of said first and second guide members are set to values not higher than that of the diameter of said wire electrode.

6. A three-point support guide for a wire electrode in a wire electric discharge machine, comprising:
- a body having a wire electrode bore formed therein;
- a first guide member formed of a small, thin diamond supported in said body so as to face said bore, said first guide member being formed with a guide groove for guiding a wire electrode;
- a first support member disposed inside one end portion of said wire electrode bore for supporting said first guide member;
- a second guide member formed of a small, thin diamond mounted on a movable member so as to face said first guide member, said movable member being movable toward and away from said first guide member;
- said movable member including a spring member fixed, at one end portion thereof, to said body and a second support member fixed to the free end portion of said spring member, said second guide member being supported by said second support member; and
- an electrical insulating layer extending along a feed path for said wire electrode mounted on said second support member.

7. A three-point support guide for a wire electrode in a wire electric discharge machine according to claim 6, wherein the diameters and thicknesses of said first and second guide members are set to values not higher than that of the diameter of said wire electrode.

8. A three-point support guide for a wire electrode in a wire electric discharge machine, comprising:
- a body having a wire electrode bore formed therein;
- a first guide member formed of a small, thin diamond supported in said body so as to face said bore, said first guide member being formed with a guide groove for guiding said wire electrode; and
- a second guide member formed of a small, thin diamond mounted on a movable member so as to face said first guide member, said movable member being movable toward and away from said guide member, aid movable member including a plate-like spring member fixed, at one end portion thereof, to said body and extending in parallel with a lengthwise axis of said body and a second support member fixed to the free end portion of said spring member, said second guide member being supported by said second support member.

* * * * *

UNITED STATES PATENT AND TRADEMARK OFFICE
CERTIFICATE OF CORRECTION

PATENT NO. : 4,833,291

DATED : MAY 23, 1989

INVENTOR(S) : TOSHIYUKI ASO ET AL.

It is certified that error appears in the above-identified patent and that said Letters Patent is hereby corrected as shown below:

Col. 1, line 8, "threepoint" should be --three-point--;

line 22, after "to" second occurrence, delete "enable" and insert --be able--;

line 56, "elecrode" should be --electrode--.

Col. 2, line 34, "t" should be --to--.

Col. 6, line 36, "aid" should be --said--.

Signed and Sealed this

Twenty-first Day of November, 1989

Attest:

JEFFREY M. SAMUELS

Attesting Officer     Acting Commissioner of Patents and Trademarks